Dec. 26, 1967    A. B. HIATT ET AL    3,360,310
AUXILIARY SUPPORT MEANS FOR A GAS BEARING
Filed Jan. 14, 1966
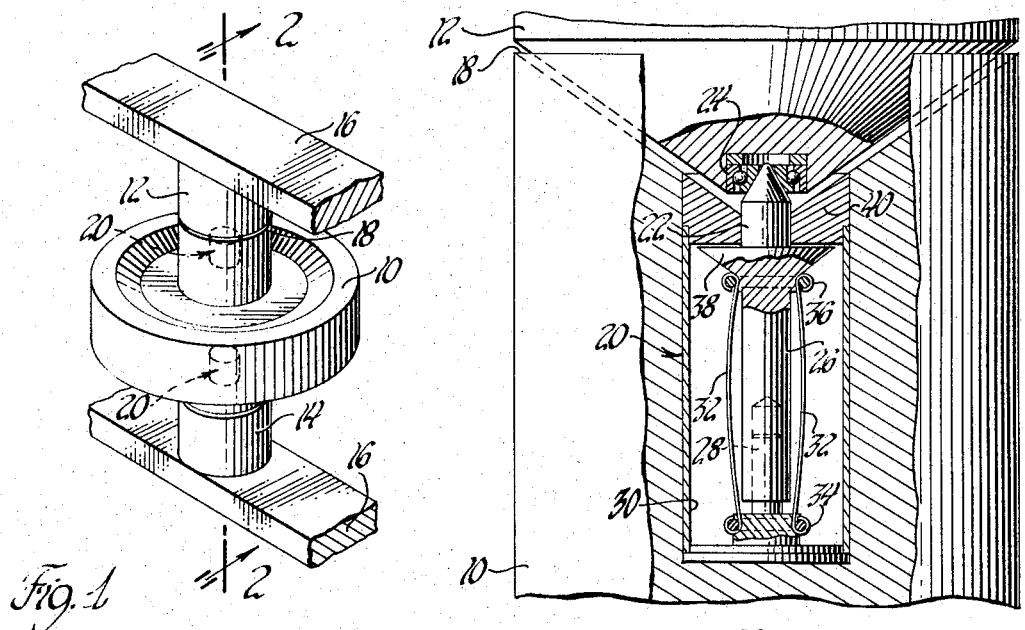
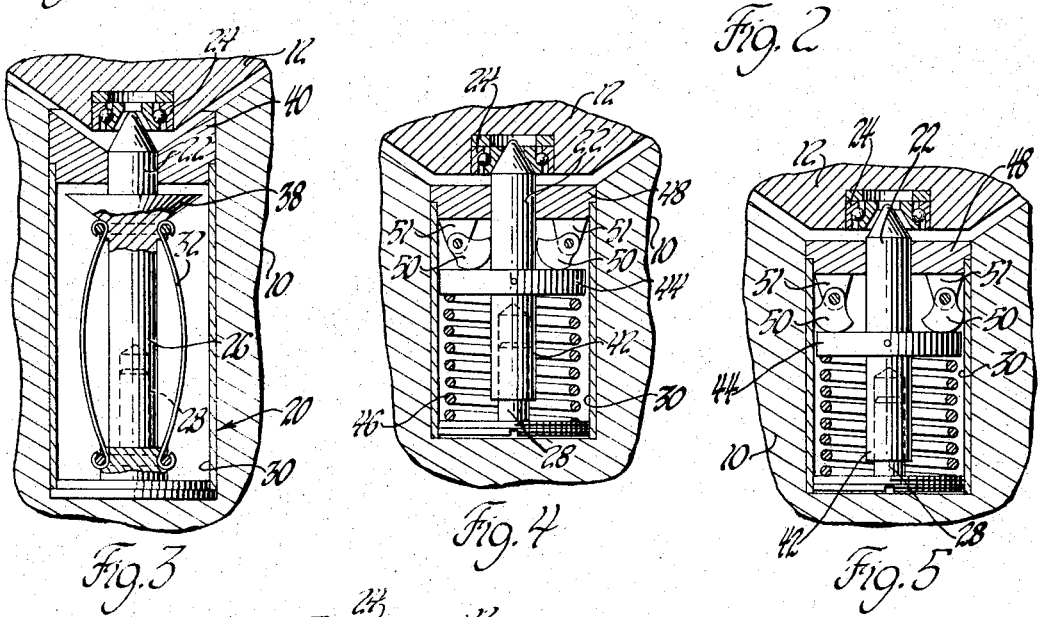
INVENTORS
Arthur B. Hiatt &
Joseph D. Koch
Hugh L. Fisher
ATTORNEY

# United States Patent Office 3,360,310
Patented Dec. 26, 1967

3,360,310
AUXILIARY SUPPORT MEANS FOR A GAS BEARING
Arthur B. Hiatt, 186 Indian Head Drive, Newark, Ohio 43055, and Joseph D. Koch, Milwaukee, Wis.; said Koch assignor to General Motors Corporation, Detroit, Mich., a corporation of Delaware
Filed Jan. 14, 1966, Ser. No. 520,808
6 Claims. (Cl. 308—35)

ABSTRACT OF THE DISCLOSURE

An auxiliary mechanical bearing to provide low speed support for rotating bodies normally supported by a hydrodynamic fluid bearing. A pivot is mounted on the rotary member and urged into engagement with a stationary race by a spring. Centrifugal force responsive means withdraws the pivot from the race when the rotary member reaches design speed.

*Summary of the invention*

This invention relates to speed responsive auxiliary support systems for rotating bodies and more particularly to such a support system as is operative to support a body for rotation about an axis at or below a predetermined speed but which is rendered inoperative by centrifugal force when the body is rotated above the predetermined speed.

Fluid bearings in which a rotating bearing surface is supported out of contact with a stationary bearing surface by a film of fluid such as air, helium or other gases, or an oil mist are commonly used in many configurations. In the hydrodynamic type bearing wherein the supporting pressure is generated by relative rotation between the rotatable and stationary bodies, the load bearing capacity of the fluid bearing drops off with decreasing speed of rotation. Consequently, during low speed operation, as occurring, for example, during run-up and run-down time of the rotatable body, the bearing surfaces come into contact thereby causing damage to the bearing surfaces.

In accordance with the present invention, the excessive wear caused during low speed operation of hydrodynamic fluid bearings is eliminated. This is accomplished by the provision of a speed responsive auxiliary support system to be used in combination with a primary system for supporting a rotatable body for rotation about an axis relative to a stationary body. The primary support system may comprise a hydrodynamic fluid bearing. In accordance with the invention, the auxiliary system may comprise at least one set of pivot and race members. One of the members is mounted on the rotatable body in a position along the axis of rotation. The other of the members is mounted on the stationary body adjacent the first member for receiving the same thereby to maintain the rotatable and stationary body in the spaced relation desirable for operation of the primary support system. The combination further comprises centrifugal force responsive means mounted on the rotatable body and associated with the member mounted thereon for taking the same out of engagement with the member mounted on the stationary body whenever the rotatable body attains a predetermined angular rate.

Accordingly, the auxiliary support system provides mechanical support for the rotatable body when operating under low speed conditions or when at rest. However, the auxiliary support system is rendered inoperative whenever the rotatable body attains the predetermined angular rate to take the auxiliary mechanical support members out of mutual engagement.

The invention may be best understood from a description of a number of specific embodiments thereof, which description is found in the following specification. This specification is to be taken with the accompanying figures of which:

FIGURE 1 shows the invention as employed in an auxiliary support system for a rotor primarily supported during high speed operation by a pair of conically shaped hydrodynamic gas bearings;

FIGURE 2 is a detailed cross-sectional view of one of the auxiliary support units taken along a section line 2—2 of FIGURE 1;

FIGURE 3 is an illustration of the embodiment of FIGURE 2 in an unengaged condition;

FIGURE 4 is a cross-sectional view of a second embodiment of the auxiliary support unit in an engaged condition;

FIGURE 5 is a cross-sectional view of the second embodiment in an unengaged condition; and FIGURE 6 is a cross-sectional view of a third embodiment in an engaged condition.

Referring now to FIGURE 1, there is shown a cylindrical rotor 10 such as may be found in a gyroscope normally supported for rotation about a vertical axis of symmetry by a pair of stator members 12 and 14. The stator members 12 and 14 may be attached to a gimbal frame 16 as will be apparent to those skilled in the art. The rotor 10 and the stators 12 and 14 are provided with complementary conical bearing surfaces as better shown in FIGURE 2 which through hydrodynamically generated gas pressure existing in bearing gaps 18 support the rotor 10 out of contact with the stators 12 and 14 for or during high speed rotation about the vertical axis of symmetry. While the axis of rotation is shown vertical in the figures, it is to be understood that the invention is not limited to any particular earth-referenced orientation.

Also shown in FIGURE 1 is a pair of auxiliary bearing units 20 disposed in spaced relation along the vertical axis of symmetry to operate in combination with the hydrodynamic conical air bearings to support the rotor 10 with respect to the stators 12 and 14 during low speed operation of rotor 10.

Referring to FIGURE 2, a first embodiment of the auxiliary bearing unit 20 is shown in greater detail. A portion of the auxiliary bearing unit 20 is mounted in a blind hole disposed axially within the rotor 10, and a second portion of the bearing unit 20 is disposed in a shallow hole axially disposed in the stator member 12. It will be understood that a similarly constructed bearing unit is also located, in the ordinary application of the invention, at the opposite axial side of the assembly as shown in FIGURE 1. The auxiliary bearing unit 20 comprises an axially extending pivot 22 mounted in the rotor hole for engagement with a race 24 located axially adjacent the pivot 22 in the stator 12. The pivot 22 is formed on the end of a pivot shaft 26 extending along the vertical axis of symmetry of the rotor 10 and displaceably supported on a post 28 which is secured to the axial end of the wall 30 of the bearing unit 20. A plurality of flat leaf-type springs 32 are anchored on one end to an anchor point 34 contiguous with the rotor-mounted post 28 and on the other end to an anchor point 36 contiguous with the pivot shaft 26. When so mounted, the leaf-type springs 32 are of a length so as to be slightly bowed thus urging the pivot 22 axially toward the race 24.

Whenever the rotor 10 is at rest or operating at or below a predetermined speed, the leaf-type springs 32 will urge the pivot 22 into engagement with the race 24 thereby to provide mechanical support for the rotor 10 relative to the stators 12 and 14. Movement in the upper direction as shown in FIGURE 2 is limited by abutment of a shoulder 38 of the shaft 26 against an end plug 40 which closes the rotor hole. The rotor 10 is then free to rotate about the vertical axis of symmetry without danger of contact between the conical bearing surfaces of the stator and rotor members. However, as shown in FIGURE 3, whenever the rotor member 10 picks up speed so as to rotate above the predetermined speed, the leaf-type springs 32, being radially displaced from the vertical axis of symmetry, are subject to centrifugal force tending to move the centroids of the springs 32 radially outward from the axis of symmetry. Whenever the centroids of the springs 32 do move radially outward from the vertical axis of symmetry, the pivot shaft 26 is axially retracted until the end of the shaft 26 contacts the base of the post 28 thus withdrawing pivot 22 out of engagement with race 24. In this condition the rotor 10 is freely and substantially frictionlessly supported by the hydrodynamic conical gas bearing to rotate about the vertical axis of symmetry. Mechanical support is not needed under these conditions and, hence, is not provided.

Referring now to FIGURE 4, a second embodiment of the auxiliary bearing means is shown to include an axially retractable pivot 22 mounted in the rotor 10 and a race 24 mounted in the stator 12 which in combination with the pivot 22 provides mechanical support for the rotor 10 with respect to the stator 12 under low speed conditions of operation. The pivot 22 is part of a pivot shaft 42 having a central collar portion 44. The pivot shaft 42 is hollowed out so as to fit sleeve fashion over a post 28 which is secured to the rotor 10 via the inner wall 30 of the bearing unit. A coil spring 46 extends between the end portion of the wall 30 and the collar portion 44 so as to normally urge the pivot 22 into engagement with the race 24 thereby to provide mechanical support for the rotor 10 with respect to the stator 12. The assembly further comprises an end plug 48 which is secured to the rotor 10 and the wall 30 and carries a pair of inertia members in the form of pivotally mounted weights 50 having peripheral camming surfaces. As shown in FIGURE 4, the weights 50 are pivotally mounted on mounting brackets 51 at points radially displaced from the vertical axis of symmetry of the rotor 10. The weights 50 are subject to centrifugal force created by rotation of rotor 10 to be radially displaced. This can only be accomplished by rotation of the weights 50 about the pivot points. As the centroids of the weights 50 rotate about the pivot points, the camming surfaces bear against the collar portion 44 such that the radial displacement of the weights is transformed into axial motion of the pivot shaft 42 as best shown in FIGURE 5 thereby to withdraw the pivot 22 from engagement with race 24.

As demonstrated by FIGURES 4 and 5, coil spring 46 normally urges pivot 22 into engagement with race 24 during low speed or at rest condition of rotor 10. In this condition the weights 50 are rotated to a radially innermost position as shown in FIGURE 4. However, when the angular rate of rotor 10 about the vertical axis of symmetry reaches a predetermined value, the centrifugal force acting upon weights 50 rotates the weights radially outward forcing the collar portion and shaft 42 to retract axially inwardly. The weights 50 continue to move radially outward until stopped by the end portion of the outer wall 30 as shown in FIGURE 5. In this position the pivot shaft 42 is axially retracted such that the pivot 22 is no longer in engagement with race 24.

FIGURE 6 shows a cam operated embodiment of the auxiliary support unit which is similar to that shown in FIGURES 4 and 5. However, in FIGURE 6 the axial force urging pivot 22 into engagement with race 24 is provided by a lightweight disc spring 52, the outer periphery of which bears against the end portion of the wall 30 and the inner periphery of which bears against the pivot shaft 42. Upon rotation of rotor 10 above a predetermined speed, the weights 50 rotate radially outward thus axially displacing the collar portion 44 of the pivot shaft 42 and flattening the disc type spring 52 to allow disengagement of pivot 22 from race 24.

The three specific embodiments of the invention shown in the figures and described above are by no means exhaustive of the variations possible and hence should not be construed in a limiting sense. For a definition of the invention, reference should be had to the appended claims.

We claim:

1. In combination with a primary system for supporting a rotatable body for rotation about an axis relative to a stationary body, auxiliary support means comprising pivot means retractably mounted on the rotatable body along said axis and normally extending axially from the rotatable body, a race mounted on said stationary body for receiving the pivot means to maintain the rotatable and stationary bodies in spaced relation, and centrifugal force responsive means operatively associated with the pivot means to retract the pivot means from engagement with the race when the rotatable body rotates about the axis above a predetermined speed.

2. In combination with a fluid bearing assembly comprising a stator having a fluid bearing surface and a rotor having a fluid bearing surface normally in spaced relation with the stator surface and adapted for rotation about an axis, auxiliary bearing means comprising a pivot retractably mounted on the rotor and normally extending therefrom along said axis, a race mounted on the stator for receiving the pivot to maintain the stator and rotor in spaced relation, and centrifugal force responsive means operatively associated with the pivot to retract same from engagement with the race when the rotor rotates about the axis above a predetermined speed.

3. In combination with a primary system for supporting a rotatable body for rotation about an axis relative to a stationary body, auxiliary support means comprising the combination of a pivot member and a race member, one of said members being mounted on the rotatable body along said axis, the other of said members being mounted on the stationary body for receiving the said one member to maintain the bodies in spaced relation, and centrifugal force responsive means operatively associated with said one member for withdrawing said one member from engagement with said other member when the rotatable body rotates about said axis above a predetermined speed, said centrifugal force responsive means comprising at least one radially displaceable inertial member pivotally mounted radially from said axis, means for transferring radial motion of the inertial member to axial motion of said one member, the combination further comprising spring means normally axially urging said one member into engagement with said other member.

4. In combination with a fluid bearing assembly comprising a stator having a fluid bearing surface and a rotor having a fluid bearing surface normally in spaced relation with the stator surface and adapted for rotation about an axis, auxiliary bearing means including pivot and race members, one of the members being retractably mounted on the rotor for movement along the axis and the other of said members being mounted on the stator for receiving said one member to maintain said spaced relation, and centrifugal force responsive means operatively associated with said one member for retracting the same from engagement with said other member when the rotor rotates about the axis above a predetermined speed, said centrifugal force responsive means comprising at least one leaf spring anchored on opposite ends to the rotor and to said one member and extending substantially parallel to but radially displaced from the axis, the spring normally urging said one member axially toward said other but radially flexible to retract said one member.

5. Apparatus as defined in claim 1 wherein the centrifugal force responsive means comprises at least one leaf spring anchored on opposite ends to the rotatable body and the pivot means and extending parallel to but radially displaced from the axis, the spring normally urging the pivot means into engagement with the race but radially flexible to axially retract the pivot means.

6. In combination with a fluid bearing assembly comprising a stator having a fluid bearing surface and a rotor having a fluid bearing surface normally in spaced relation with the stator surface and adapted for rotation about an axis, auxiliary bearing means including pivot and race members, one of the members being retactably mounted on the rotor for movement along the axis and the other of said members being mounted on the stator for receiving said one member to maintain said spaced relation, and centrifugal force responsive means operatively associated with said one member for retracting the same from engagement with said other member when the rotor rotates about the axis above a predetermined speed, said centrifugal force responsive means comprising at least one radially displaceable inertia member pivotally mounted radially from said axis, means for transferring radial motion of the inertia member to axial motion of said one member, the combination further comprising spring means normally axially urging said one member into engagement with said other member.

References Cited

UNITED STATES PATENTS 3,026,154   3/1962   Marchand _____ 308—35

MARTIN P. SCHWADRON, Primary Examiner.

FRANK SUSKO, Examiner.